Nov. 29, 1960

H. W. STRAUB 2,962,142

POWER OPERATED CLUTCH

Filed Nov. 25, 1955

INVENTOR.
HERMANN W. STRAUB,
BY
ATTORNEYS.

Nov. 29, 1960     H. W. STRAUB     2,962,142
POWER OPERATED CLUTCH

Filed Nov. 25, 1955     2 Sheets-Sheet 2

INVENTOR.
HERMANN W. STRAUB,
BY
Parry & Fiese.
ATTORNEYS.

United States Patent Office 2,962,142
Patented Nov. 29, 1960

2,962,142
POWER OPERATED CLUTCH

Hermann W. Straub, Friedrichshafen, Germany, assignor to I-T-E Circuit Breaker Company, Philadelphia, Pa., a corporation of Pennsylvania Filed Nov. 25, 1955, Ser. No. 549,094

Claims priority, application Germany June 15, 1955

11 Claims. (Cl. 192—84)

This invention relates to power operated clutches and more particularly to clutches operated by electromagnetic or fluid power.

The principal object of the invention is to provide a clutch structure in which the armature is not relied on to assume torque strain, and is independent of torque transmission or is mechanically isolated, in the case of an electromagnetic clutch or in any event, in which the actuating elements of the clutch are not thus relied on.

A further object of the invention is to provide a power-operated clutch structure wherein the size and mass of various moving parts is substantially reduced.

The invention will now be described in conjunction with the drawing in which.

Figure 1:
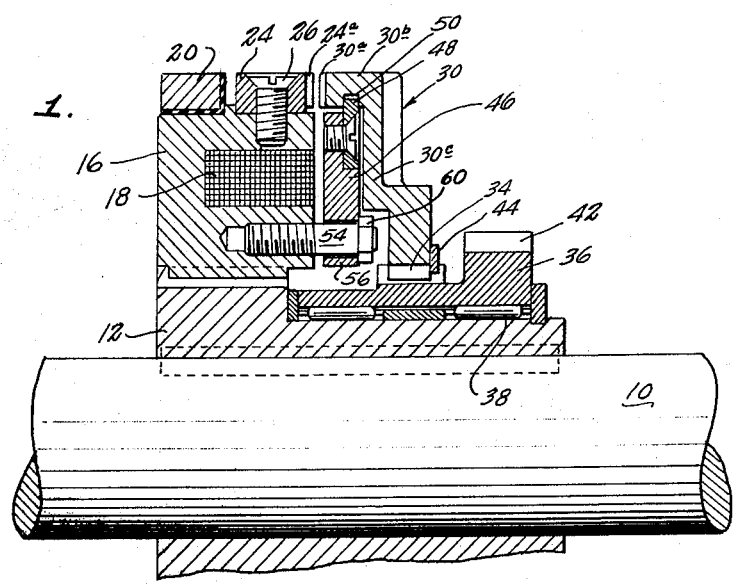
Fig. 1 shows a partial elevation in section of one form of the invention.

Referring to Fig. 1, the invention comprises a drive shaft 10 on which is keyed a sleeve 12, to which sleeve is further keyed a solenoid body 16. The solenoid body carries a solenoid coil 18 which will be understood to be energizable through a slip ring such as 20. Thus, the solenoid coil 18 rotates with drive shaft 10. Carried on the solenoid body 16 is a clutch ring 24 having teeth 24a, and a plurality of annularly arranged bolts such as 26 may be utilized to securely hold the ring 24 to the solenoid body. A complementary reciprocable clutch component 30 is utilized having teeth 30a at the edge of skirt 30b engageable with teeth 24a. The component 30 is fashioned with a disc-like body 30c having an inner annular opening which is slidably splined at 34 to a sleeve 36 carried by bearings 38 on shaft 10. Thus, sleeve 36 is the driven sleeve and may have gear teeth as indicated by the tooth 42. Acting as a limiting means for the element 30 may be a lock ring 44 which engages splines on sleeve 36 in a well understood manner. Thus, lock ring 44 remains stationary with respect to the splines and limits the motion of element 30 to the right.

The clutch component 30 carries an armature 46 which is bolted to a split ring 48 accommodated in a groove 50 internally of the flange of the element 30.

A plurality of annularly spaced bolts 54 are threadedly carried by the solenoid body 16 which bolts pass through respective bores 56 in the armature, each bolt being terminated in a respective nut 60.

From the above it will be apparent that the armature is toroidal in shape and is guided with respect to the solenoid body by means of the bolts 54 which have free sliding connection in their respective bores 56. Thus, the armature and the solenoid body rotate with the shaft 10 independently of the clutch component 30, and no torque stress is transmitted through the armature thereto. When, however, the solenoid is energized movement of the armature to the left, as viewed on Fig. 1, effects engagement of the teeth 24a with teeth 30a to transmit torque to the clutch element 30 and thence to the sleeve 36, via the splined engagement at 34.

In the above construction, the clutch ring 24 may be non-magnetic as, in fact, may the clutch component 30. Further, it will be apparent that the armature 46 may be spring biased away from the solenoid body when the solenoid is not energized; for example, by putting a single spring coil (not shown) about each of the bolts 54 intermediate the armature and the solenoid body. If desired, a counterbore may be provided in either the armature or the solenoid body surrounding each bolt so that the spring coil may be completely compressed therein so that the armature may meet the face of the solenoid body when the coil is energized. Other means of biasing the armature away from the solenoid body may, of course, be utilized as will be fully understood by persons skilled in the art.

Figure 2:
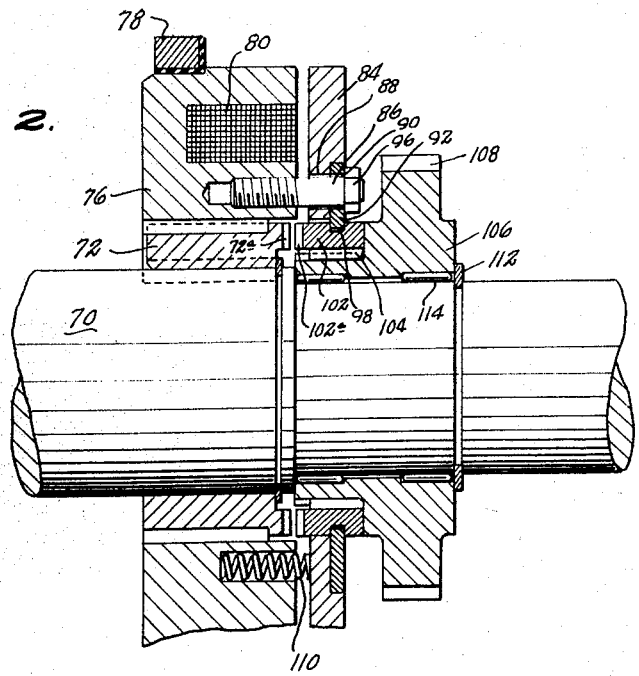
Fig. 2 shows a partial elevation in section of another form of the invention.

In the form of the invention shown in Fig. 2, a driven shaft 70 is utilized to which is keyed a clutch ring in the form of a collar 72 having teeth 72a, mounted on the collar and keyed thereto is a magnetic solenoid body 76 having a slip ring 78 for feeding the solenoid coil 80, in a well understood manner. Thus, it will be appreciated that the shaft and the collar 72 along with the solenoid body rotate in unison. An armature 84 is carried by the solenoid body on a series of annularly spaced bolts 86 having threaded connection with the solenoid body and passing through respective bores 88 in the armature. The bolts also pass through respective apertures 90 in a split ring 92 and each bolt terminates in a nut 96. The split ring 92 will be understood to be fastened to the armature as by bolts (not shown), and is rotatively accommodated in a groove 98 in a clutch ring 102 having clutch teeth 102a. The clutch ring 102 has slidable, splined engagement at 104 with a driving sleeve 106 carrying the gear 108. While sleeve 106 is described as the driving member and shaft 70 as the driven member, it will be apparent to those skilled in the art that their function could be reversed.

From the foregoing description it will be apparent that the armature, the solenoid body, and the shaft rotate in unison and that by virtue of the rotative fit of the split ring 92 in the clutch ring 102, the driving sleeve 106 will not rotate unless the armature is pulled toward the solenoid body upon energization thereof so as to mesh the teeth 72a with the teeth 102a. A plurality of annularly spaced springs such as 110 suitably carried in sockets of the solenoid body, as shown, and bearing against the armature 84 may be utilized to bias the armature away from the solenoid body. Such springs may be annularly disposed intermediate the arraay of bolts 86. A lock ring 112 may be utilized which fastens to the shaft 70, to lock sleeve 106 in place against the shoulder of the shaft as shown, sleeve 106 being preferably provided with bearing mount 114 so as to normally turn freely on the shaft when the clutch is not energized.

Figure 3:
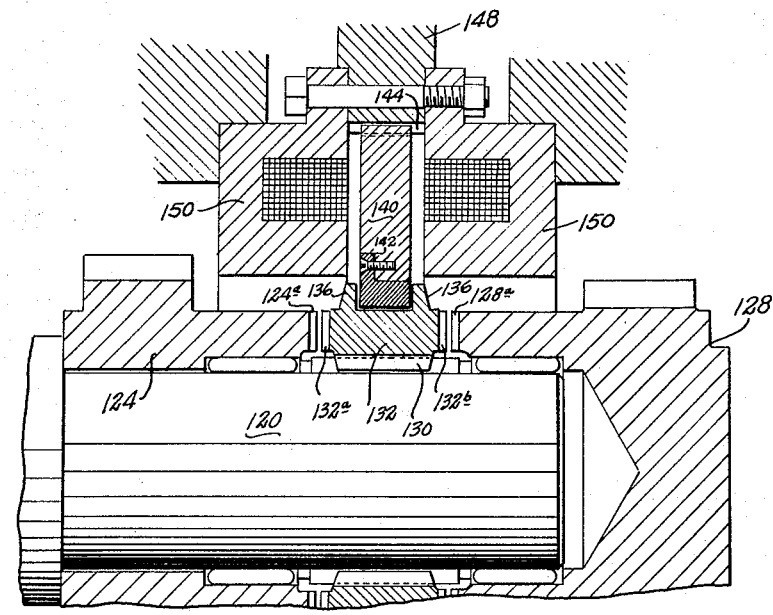
Fig. 3 shows a partial elevation in section of a further form of the invention.

In the form of the invention shown in Fig. 3, a double clutch is disclosed utilizing the basic principle of the invention as thus far described in that the armature member is not required to carry any torque load. In this embodiment a driving shaft 120 is utilized on which are rotatably carried a driven sleeve 124 and a second driven sleeve 128. Slidably splined at 130 to the drive shaft is a clutch ring 132 having teeth 132a engageable with the teeth 124a of sleeve 124 and likewise having teeth 132b engageable with the teeth 128a of ring 128. It will, of course, be appreciated that the clutch ring 132 engages with either of the sleeves 124 or 128, depending upon the direction of shift of the ring 132.

For the purpose of effecting shifting of sleeve 132 the sleeve is formed with spaced peripheral flanges 136 between which is interposed an armature disc 140. Preferably, divided anti-friction bearing rings such as 142 are carried by the armature disk to minimize side friction against the internal surfaces of the flanges 136. The armature is slidably splined at its outer periphery as at 144 with annular housing component 148 to which is bolted a pair of spaced solenoids 150 having respective solenoid coils facing the sides of the armature as shown.

From the above description it will be apparent that if either coil is energized, the armature will be drawn thereto, so as to shift ring 132 to effect engagement selectively with either sleeve 124 or 128, depending upon which solenoid has been energized. Accordingly, the armature is non-rotative in this instance, but is reciprocal between the solenoid bodies. The entire torque or transmission passes from shaft 120 through ring 132 and thence to either of the driven sleeves.

Figure 4:
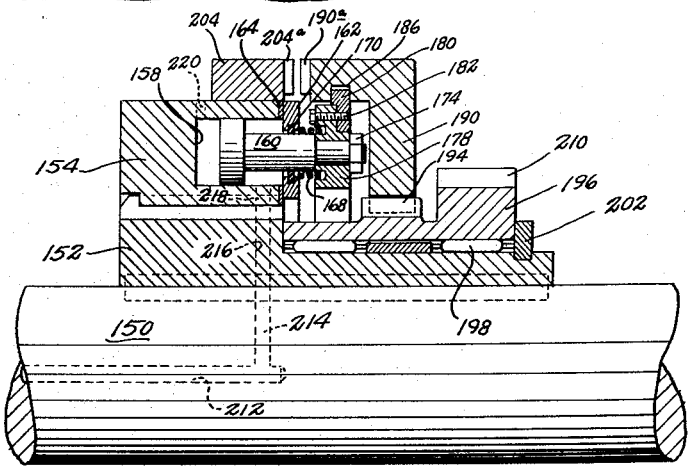
Fig. 4 shows a partial elevation in section of yet another form of the invention.

In the form of the invention shown in Fig. 4, a departure from the preceding embodiments is made in various ways, primarily in the type of power utilized for effecting shifting of the clutch. Thus, in Fig. 4 the driving shaft 150 has keyed thereto a sleeve 152 to which a surmounting ring 154 is keyed. The ring 154 is provided with a plurality of annularly spaced pressure cylinders in the form of sockets 158 in each of which cylinders is a piston and integral rod, designated as 160. A closure plate 162 effects closing of the plurality of the openings afforded by the sockets 158. Preferably a sealing member or gasket 164 is disposed about the openings against which gasket the plate 162 is pressed as by a plurality of annularly spaced bolts (not shown) secured to ring 154. A gland seal such as 170 may be utilized around each such rod, as shown, carried in a groove around each of the apertures in the plate 162 through which the respective rods pass. The outer ends of the rods are fastened as by a nut 174 to a pressure plate 178.

From the foregoing description it will be apparent that the pistons may move reciprocally in their respective cylinders in unison, since they are all fastened rigidly to the pressure plate 178. The pressure plate is mounted for reciprocal motion by having split ring 180 secured thereto as by bolts 182, which ring is relatively accommodated in a groove 186 in a clutch ring 190 having teeth 190a. The clutch ring 190 is slidably splined at 194 to a sleeve 196 rotatably carried on bearings 198 on a turned-down portion of the sleeve 152 and locked in place by a lock ring 202. Thus, it will be noted that movement of the pistons will effect longitudinal motion of clutch ring 190 but that the pistons, secured to pressure plate 178, rotate with that ring and with the shaft 150 while the clutch ring 190, which will be understood to be coupled to the load through sleeve 196, remains stationary.

Carried on the ring 154 is the driving clutch ring 204 suitably fastened thereto so as to rotate therewith. Thus, it will be apparent that when the pistons move to the left, as shown in Fig. 4, against the bias of springs 168, the teeth 190a will mesh with 204a of clutch ring 204 so that torque may be transmitted from shaft 150 through sleeve 152, ring 154, clutch ring 204, clutch ring 190, to sleeve 196, carrying a gear as represented by the tooth 210.

In order to actuate the pistons 160, shaft 150 is provided with a central bore 212, communicating with a plurality of radially disposed bores 214, each of which will be understood to feed through registering bores such as 216, 218 in the elements 152 and 154, respectively, all as indicated in dotted lines. Thus, each of the bores 214 opens into a cylinder 158 in which a suitable vent, such as 220, is provided at the outer end. Accordingly, it will be appreciated that if a source of oil pressure or other fluid pressure be connected to the bore 212, distribution will be had to each of the cylinders, thereby forcing the pistons to the left, as viewed on Fig. 4, and effecting meshing of the teeth 190a with 204a in a manner hereinabove described.

Having thus described my invention, I am aware that changes may be made without department from the spirit of the invention, and I therefore do not seek to be limited to the precise illustrations as herein given except as set forth in the appended claims.

I claim:

1. A power-operated clutch comprising a rotative shaft, a movable clutch actuating means positioned concentrically with respect to said rotative shaft, a clutch ring concentric with said shaft and keyed thereto, a second clutch ring rotative in respect to said shaft and engageable with said first-mentioned clutch ring, one of said rings being reciprocal, in response to force applied by said clutch actuating means, to engage the other of said rings to effect rotation thereof, said clutch actuating means being mechanically isolated from said one of said rings; said clutch actuating means being independent of torque transmission when said clutch rings are brought into engagement.

2. A power-operated clutch comprising a rotative driving shaft, a movable clutch actuating means positioned concentrically with respect to said rotative shaft, a driving clutch ring concentric with said shaft and keyed thereto, a driven clutch ring carried by said shaft and rotative with respect thereto, and engageable with said driving clutch ring, said driving clutch ring being reciprocal in response to force applied thereto by said clutch actuating means to engage said driven ring to effect rotation thereof, said clutch actuating means being mechanically isolated from said driving clutch ring; said clutch actuating means being independent of torque transmission when said clutch rings are brought into engagement.

3. In a device as set forth in claim 1, including a sleeve mounted on said shaft, said clutch actuating means being mounted on said sleeve and keyed thereto, and said sleeve being keyed to said shaft wherein said clutch actuating means rotate with said shaft.

4. In a device as set forth in claim 1, including a solenoid magnet rotative with said shaft, one of said clutch rings being secured to and rotative with said solenoid magnet, an armature secured to and carried by said solenoid magnet so as to be rotative therewith and forming said clutch actuating means, including means for reciprocally mounting said armature on said solenoid magnet whereby said armature is movable with respect thereto.

5. A device as set forth in claim 1, wherein said clutch actuating means comprises a force-applying element rotative with said shaft, a plate rotative with said shaft and mounted for longitudinal motion with respect to said element wherein said element may apply force to move said plate, one of said clutch rings being secured to and rotative with said shaft, the other of said clutch rings being mounted for relative rotation on said shaft, said plate having relative rotation with respect to said other clutch ring and connected thereto so as to effect motion thereof to cause engagement with said first-mentioned clutch ring when said plate is moved by said power-applying element.

6. A device as set forth in claim 5, wherein said power-applying element comprises a solenoid magnet body and said plate comprises an armature.

7. A device as set forth in claim 6, wherein said solenoid magnet body is concentrically mounted on and carried by one of said clutch rings, and wherein said armature is supported from the other of said clutch rings.

8. A device as set forth in claim 5, wherein one of said clutch rings is mechanically connected to and carried by said solenoid magnet body and the other of said clutch rings is mechanically connected to and carried by said armature.

9. A device as set forth in claim 5, wherein said power-applying element comprises a plurality of fluid pressure pistons annularly spaced about the axis of said shaft, said pistons being secured to said plate and being movable within respective relatively stationary cylinders; said pistons and said plate being movable responsive to application of high pressure fluid to said cylinders.

10. A device as set forth in claim 1, wherein said power-applying means is mounted so as to be stationary, said clutch rings being carried on said shaft, one of said clutch rings being relatively non-rotative with respect thereto and slidable thereon and the other of said clutch rings being relatively rotative with respect thereto, said plate being non-rotatively mounted and being reciprocal with respect to said shaft and engageable with said slidable clutch ring to effect engageable of said rings.

11. A device as set forth in claim 1, said power-applying means comprising a pair of spaced solenoid magnet bodies, an armature intermediate said bodies, and mounted so as to be slidable with respect to said shaft, and being non-rotative, one of said clutch rings being carried by said shaft, and splined so as to be non-rotative with respect thereto and slidable thereon and having opposite faces provided with respective sets of clutch teeth, said second clutch ring having a set of teeth engageable with one of the sets of teeth of said non-rotative clutch ring, a third clutch ring rotatively mounted on said shaft and having a set of teeth engageable with the other set of teeth of said slidable clutch ring, wherein said latter clutch ring may reciprocate longitudinally in either direction to selectively engage the second or third clutch rings, said armature being engageable with said slidable clutch ring and being movable in either direction to effect selective engagement upon selective energization of one of said magnet bodies.

References Cited in the file of this patent

UNITED STATES PATENTS

| | | |
|---|---|---|
| 936,284 | Abernethy | Oct. 12, 1909 |
| 1,787,225 | Wittkuhns | Dec. 30, 1930 |
| 1,814,424 | Barr | July 14, 1931 |
| 1,989,984 | Hope | Feb. 5, 1935 |
| 2,428,336 | Munschauer | Sept. 30, 1947 |
| 2,633,218 | Pielstick | Mar. 31, 1953 |
| 2,717,066 | Malick | Sept. 6, 1955 |

FOREIGN PATENTS

| | | |
|---|---|---|
| 534,709 | Great Britain | Mar. 14, 1941 |